(12) United States Patent
Neal

(10) Patent No.: US 11,480,336 B2
(45) Date of Patent: Oct. 25, 2022

(54) FIRE STARTER

(71) Applicant: HOT BOX STOVES LIMITED, York (GB)

(72) Inventor: Oliver Justin Neal, York (GB)

(73) Assignee: HOT BOX STOVES LIMITED, York (GB)

( * ) Notice: Subject to any disclaimer, the term of this patent is extended or adjusted under 35 U.S.C. 154(b) by 0 days.

(21) Appl. No.: 17/253,377

(22) PCT Filed: Feb. 6, 2019

(86) PCT No.: PCT/GB2019/050311
§ 371 (c)(1),
(2) Date: Dec. 17, 2020

(87) PCT Pub. No.: WO2020/002867
PCT Pub. Date: Jan. 2, 2020

(65) Prior Publication Data
US 2021/0262664 A1    Aug. 26, 2021

(30) Foreign Application Priority Data

Jun. 27, 2018  (GB) .................................. 1810504
Jul. 31, 2018  (GB) .................................. 1812511

(51) Int. Cl.
*F23Q 13/04* (2006.01)
*C10L 5/44* (2006.01)
(Continued)

(52) U.S. Cl.
CPC .............. *F23Q 13/04* (2013.01); *C10L 5/442* (2013.01); *C10L 11/04* (2013.01); *C10L 11/06* (2013.01); *C10L 2230/06* (2013.01)

(58) Field of Classification Search
CPC .......... F23Q 13/04; C10L 5/442; C10L 11/04; C10L 11/06; C10L 2230/06
See application file for complete search history.

(56) References Cited

U.S. PATENT DOCUMENTS 4,063,904 A    12/1977  Beeson
4,627,854 A *  12/1986  Pratt .................... C10L 11/04
                                                      44/520

(Continued)

FOREIGN PATENT DOCUMENTS

CA    2852290    * 11/2015
CA    2871765 A1    5/2016
(Continued)

OTHER PUBLICATIONS

Great Britain Search Report for Application No. GB 1810504.9, dated Dec. 6, 2018, (4 pages), Intellectual Property Office, South Wales, United Kingdom.
(Continued)

*Primary Examiner* — Cephia D Toomer
(74) *Attorney, Agent, or Firm* — Alston & Bird LLP

(57) ABSTRACT

The present invention provides apparatus for starting a fire, comprising a stack of combustible fuel elements (340,350, 460,462,464) and a flammable ignition element (450) located in a combustible container (200) configured to provide at least one aperture (202) for igniting the flammable ignition element located therein. A kit of parts and a method of assembling the kit are also provided.

20 Claims, 7 Drawing Sheets

(51) Int. Cl.
  *C10L 11/04* (2006.01)
  *C10L 11/06* (2006.01)

(56) References Cited

U.S. PATENT DOCUMENTS

| | | |
|---|---|---|
| 2015/0191669 A1 | 7/2015 | Preciat Cervera et al. |
| 2017/0002284 A1 | 1/2017 | Price |
| 2017/0253823 A1* | 9/2017 | Jones ...................... C10L 11/04 |

FOREIGN PATENT DOCUMENTS

| | | |
|---|---|---|
| GB | 130923 A | 8/1919 |
| GB | 2235209 A | 2/1991 |
| GB | 2442702 A | 4/2008 |
| KR | 10-1694078 B1 | 1/2017 |
| WO | WO-2020/002867 A1 | 1/2020 |

OTHER PUBLICATIONS

Great Britain Search Report for Application No. GB1901607.0, dated Jul. 22, 2019, (4 pages), Intellectual Property Office, South Wales, United Kingdom.

International Searching Authority, International Search Report and Written Opinion for International Application No. PCT/GB2019/050311, dated Apr. 30, 2019, (11 pages), European Patent Office, Rijswijk, Netherlands.

* cited by examiner

FIRE STARTER

CROSS REFERENCE TO RELATED APPLICATIONS

This application is a National Stage Application, filed under 35 U.S.C. § 371, of International Application No. PCT/GB2019/050311, filed Feb. 6, 2019, which international application claims priority to and the benefit of both Great Britain Application No. 1810504.9, filed Jun. 27, 2018, and Great Britain Application No. 1812511.2, filed Jul. 31, 2018; the contents of all of which as are hereby incorporated by reference in their respective entireties.

BACKGROUND

Related Field

The present invention relates to apparatus for starting a fire. In particular, but not exclusively, the present invention relates to apparatus for quickly, safely and efficiently lighting a fire for a variety of different applications.

Description of Related Art

A conventional wood burning stove includes a closed metal firebox, typically steel or cast iron and lined with fire brick, which is connected to a suitable flue by a flue pipe, and one or more controls to selectively adjust the amount of air being drawn into the firebox during the combustion process. Such stoves are generally used to burn wood fuel, such as a logs or wood-derived biomass fuel, but also coal and/or peat to produce heat for heating and/or cooking.

Lighting a wood burning stove typically involves arranging dry kindling on the grate or firebed of the stove and lighting the same using paper or firelighters to heat the firebox and warm the chimney to aid flue performance. Once the kindling is burning well, larger pieces of split wood are added to create a stable firebed followed by larger logs when an efficient and stable fire has been established. Other fire lighting methods include the 'top-down' method which involves creating a channel between a pair of spaced apart logs, locating paper or firelighters in the channel, and forming a bridge of kindling over the channel. However, many people continue to struggle to successfully light a fire, be it in a wood burning stove, a multifuel stove, an open fire, a barbecue, a pizza oven, a fire pit or a camp fire. A fire which is burning inefficiently from the start will produce excessive smoke, which wastes energy and causes air pollution, and the flue will become lined with creosote which is a significant fire hazard.

BRIEF SUMMARY

It is an aim of certain embodiments of the present invention to provide apparatus for quickly and safely starting a fire in an efficient and consistent manner for a variety of different applications.

According to a first aspect of the present invention there is provided apparatus for starting a fire, comprising:
 a stack of combustible fuel elements and a flammable ignition element located in a combustible container configured to provide at least one aperture for igniting the flammable ignition element located therein.

Optionally, the container comprises an openable portion configured to selectively provide the at least one aperture.

Optionally, the at least one aperture is located below the ignition element.

Optionally, the ignition element is supported by at least two of the fuel elements.

Optionally, the ignition element is located on an intermediate retaining element above a first spaced apart pair of the fuel elements located at a base region of the container.

Optionally, the first pair of spaced apart fuel elements are located in a base retaining element disposed on the base region of the container.

Optionally, the intermediate retaining element is supported between a second spaced apart pair of the fuel elements located on and oriented perpendicularly to the first pair of fuel elements.

Optionally, the intermediate retaining element defines a channel for locating the ignition element between the second pair of spaced apart fuel elements.

Optionally, the intermediate retaining element comprises a base portion and a pair of elongate retaining portions extending outwardly in opposed directions therefrom to engage and retain a respective one of the second fuel elements in a predetermined position and orientation within the container.

Optionally, further combustible fuel elements are located on the second layer to form further layers of the stack, the fuel elements of each layer being spaced apart and oriented substantially perpendicular to the fuel elements of adjacent layers.

Optionally, the apparatus comprises at least one further retaining element to prevent at least the fuel elements of the further layers from substantially moving with respect to each other and the container.

Optionally, the at least one further retaining element comprises a plurality of vertically oriented retaining portions located between the spaced apart fuel elements of the further layers.

Optionally, the at least one further retaining element comprises an upper portion from which each retaining portion extends and having at least one aperture therein.

Optionally, the at least one further retaining element is combustible.

Optionally, the container comprises at least one further aperture pre-formed or formable in a side wall thereof.

Optionally, the container comprises a lid having at least one hole pre-formed or formable therein.

According to a second aspect of the present invention there is provided a kit of parts for assembling apparatus for starting a fire, comprising:
 a plurality of combustible fuel elements for making a stack;
 a flammable ignition element for inclusion in the stack; and
 a combustible container configured to provide at least one aperture for igniting the flammable ignition element when the stack is located therein.

Optionally, the kit comprises at least one retaining element for substantially retaining at least one layer of said fuel elements in the stack in a desired position and orientation within the container.

According to a third aspect of the present invention there is provided a method of assembling apparatus for starting a fire, comprising:
 locating a stack of combustible fuel elements and a flammable ignition element in a combustible container configured to provide at least one aperture for igniting the flammable ignition element located therein.

Optionally, the method comprises supporting the ignition element by at least two of the fuel elements located in the container, wherein the supporting fuel elements are spaced apart and located on each side of the at least one aperture or an openable portion of the container configured to selectively provide the at least one aperture.

Optionally, the method comprises locating the ignition element on an intermediate retaining element above a first spaced apart pair of the fuel elements located on a base of the container.

Optionally, the method comprises supporting the intermediate retaining element between a second spaced apart pair of the fuel elements located on and oriented perpendicularly to the first pair of fuel elements.

Optionally, the method comprises locating further layers of said fuel elements on the second layer, the fuel elements of each further layer being spaced apart and oriented substantially perpendicular to the fuel elements of adjacent layers.

Optionally, the method comprises locating at least one further retaining element into the stack to prevent at least the fuel elements of the further layers from substantially moving with respect to each other and the container.

Optionally, the method comprises closing a lid of the container.

BRIEF DESCRIPTION OF THE FIGURES

Certain embodiments of the present invention will now be described with reference to the accompanying drawings in which.

DETAILED DESCRIPTION OF VARIOUS EMBODIMENTS

Figure 1:
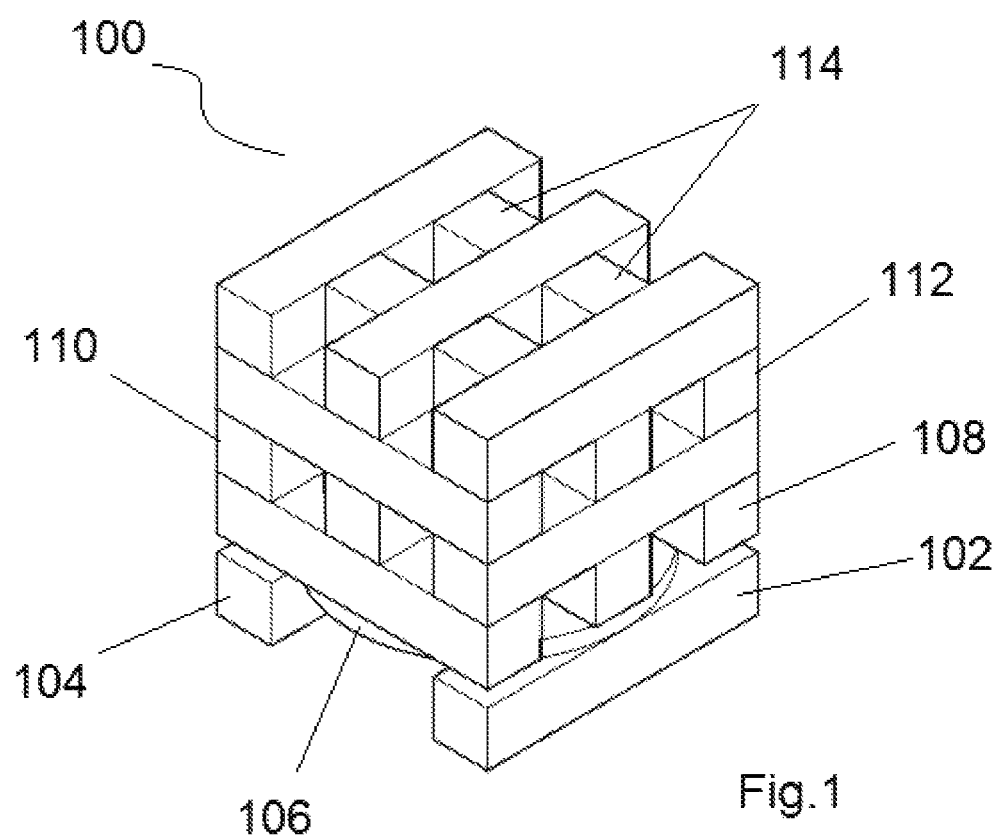
FIG. 1 illustrates a stack of combustible fuel elements and a flammable fuel element for locating in a container.

As shown in FIG. 1, according to certain embodiments of the present invention, a plurality of elongate and horizontally oriented wood-based fuel elements is arranged in a Jenga™-style formation to form a cuboidal stack 100. Each fuel element is around 100 mm to 120 mm long and has a square cross section of around 20×20 mm. However, each fuel element may be any suitable length and cross-sectional shape and size for a particular fire-lighting application. Aptly, each fuel element is a soft wood such as pine, fir, or cedar, or the like.

Figure 2:
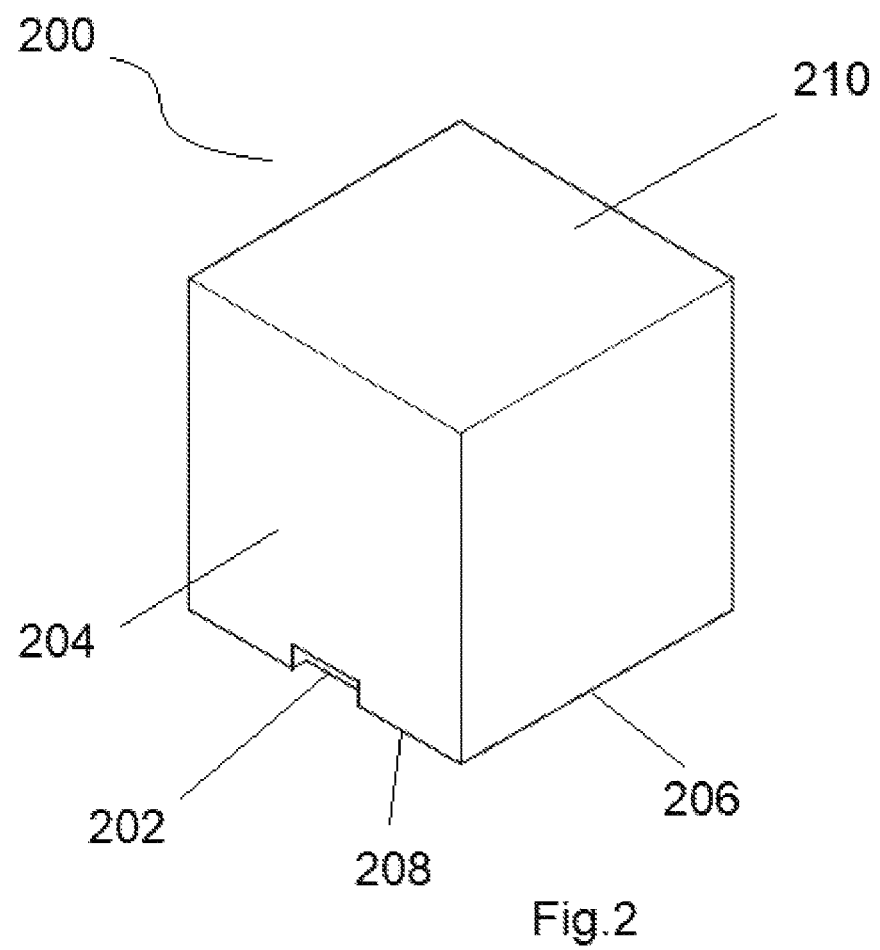
FIG. 2 illustrates a box containing a stack as illustrated in FIG. 1.

The stack 100 is sized and shaped to be located in a correspondingly sized and shaped combustible container, such as a cuboid box 200 as shown in FIG. 2, to thereby be securely contained therein to avoid excessive movement/collapse during transit, storage and use. The stack 100 comprises a pair of spaced apart and substantially parallel fuel elements 102,104 for locating in the base of the container 200 such that a window 202 in a side wall 204 of the container and proximal to the base 206 is located between the pair of base fuel elements 102,104. Supported on the base fuel elements 102,104 is a flammable ignition element 106, e.g. a solid fuel firelighter, which is relatively flammable with respect to the combustible wood-based fuel elements to accelerate ignition and combustion thereof. The flammable fuel element/accelerator 106 may comprise hexamine or may alternatively comprise natural constituents not derived from highly flammable material or petrochemical based elements. The flammable fuel element/accelerator 106 is substantially disc-shaped and has a diameter of around 100-120 mm and a thickness of around 6-8 mm, but it may be a different shape/size, such as square, rectangular, triangular, oval, or the like, or it may correspond in size/shape/cross section to the combustible fuel elements in the stack. A plurality, aptly three, spaced apart combustible wood-based fuel elements 108 are arranged on the flammable fuel element 106 and oriented substantially perpendicular with respect to the spaced apart base fuel elements 102,104. Further layers of spaced apart combustible fuel elements 110,112, aptly three in each layer, are provided to form the stack 100 wherein each layer of elements is oriented substantially perpendicularly with respect to its adjacent layer located below and above. The number of layers in the stack 100 may correspond with the height of the container 200.

To prevent the substantially horizontally oriented fuel elements in each layer moving/collapsing during transit, storage or use, one or more substantially vertically oriented retaining elements 114 may be provided to pass through the gaps between the layers of horizontally arranged fuel elements. The retaining elements 114 may be combustible or non-combustible. They may be left in the stack or removed and discarded before the apparatus is used. For example, the retaining elements 114 may be substantially combustible and removed from the stack before being placed on top of the stack in a substantially perpendicular orientation with respect to the fuel elements of the layer below to thereby form an uppermost layer of the stack. Alternatively, the container may be shaped to securely retain the fuel elements located therein to prevent them moving during transit, storage and use. Further alternatively, one or more regions of the container may extend from an inner surface thereof to engage with the stack and prevent the same from moving/collapsing during transit, storage and use. Further alternatively, at least one support element, such as a collar or a sleeve, may engage around a portion of the stack to prevent the fuel elements from moving during transit, storage or use. Such a support element may be combustible and left in situ when lighting the apparatus or may be removed from the apparatus prior to lighting the apparatus.

As illustrated in FIG. 2, the combustible container 200 is aptly a box having an interior sized and shaped to correspond with the size and shape of the stack 100. The stack 100 may be arranged such that the combustible fuel elements 102,104, 108,110,112 and the flammable fuel element/s 106 are fixed together, e.g. by a suitable adhesive, such that the stack 100 may be lifted and lowered into the container during assembly thereof. Alternatively, the stack 100 may be arranged within the container by sequentially locating the individual components therein. The stack 100 is located in the container such that the window 202 is located between the pair of base fuel elements 102,104. This desirably allows a user to locate a naked flame, e.g. from a match or cigarette lighter or the like, inside the container and directly underneath the flammable fuel element 106 which is raised above the base of the container by the spaced apart support/base fuel elements 102,104. The window 202 also allows a sufficient amount of air to be efficiently drawn into the container and under the stack to ensure efficient and rapid ignition and combustion of the combustible fuel elements located above the flammable fuel element. Supporting the flammable fuel element/s 106 on at least one layer of support/base fuel elements 102,104 allows the stack to burn in a desirable 'top-down' method for longer combustion and efficient ignition of larger fuel elements later placed on the fire. This arrangement also allows air to flow from underneath and through the stack.

The window 202 in the container 200 as illustrated in FIG. 2 is substantially slotted and extends from a base edge region 208 into a side wall 204 and the base 206. The window 202 is aptly configured to allow access to the firelighter 106 using a conventional cigarette lighter so that the outside of the container does not need to be ignited to create the initial combustion of the stack. Furthermore, the window 202 serves to draw air into the container at this point to aid initial combustion of the firelighter and subsequently the fuel contained therein. The window 202 is located substantially centrally in the side wall and base. However, the window 202 may be located in the side wall 204 only and/or may be offset from centre. Further alternatively, a plurality of windows may be provided proximal the base of the container. For example, a first window may be provided in a first wall of the container for igniting the flammable fuel element 106 and a second window may be provided on another wall opposed to the first wall which may also allow a user to ignite the flammable fuel element and/or provide an additional air intake for rapid and efficient ignition and combustion. The window 202 may be always open or may alternatively be closed during transit and storage but openable for use. For example, a portion of the container may be openable by a user to reveal the window, e.g. a closure portion movable about a fold line, or a tear away or peel away portion, or the like. Alternatively, the openable portion may be a frangible portion which may be fully or partially removable from the wall of the container by a user via score lines or perforations or the like to provide the window therein. A pull-out wick or the like may be provided to aid in the lighting of the flammable fuel element 106 via the window.

One or more further apertures, e.g. holes, slots, perforations, or the like, may be provided in the walls of the container to provide additional air intakes for rapid and efficient ignition and combustion. One or more relatively small apertures, such as narrow elongate slots and/or small holes of around 1-5 mm wide, may be desirable to cause air to be sucked and accelerated into the container during combustion.

The container 200 is aptly made of combustible material, such as recycled cardboard or substantially rigid paper, and may have an open upper region or it may include a lid 210 which can be closed after the stack 100 is located therein during assembly. The lid 210 may include one or more apertures to act as a chimney and allow combustion gases to be exhausted from the container. The external surfaces of the container may include graphics such as a product/company name, logo, trade mark, and/or instructions. The container 200 is aptly around 120×120×120 mm but may be any suitable size and shape to contain a stack of fuel elements according to certain embodiments of the present invention. Aptly the container has a substantially flat base for stability when located on a grate or firebed.

A further embodiment of the present invention is illustrated in FIGS. 3a to 5.

Figure 3A:
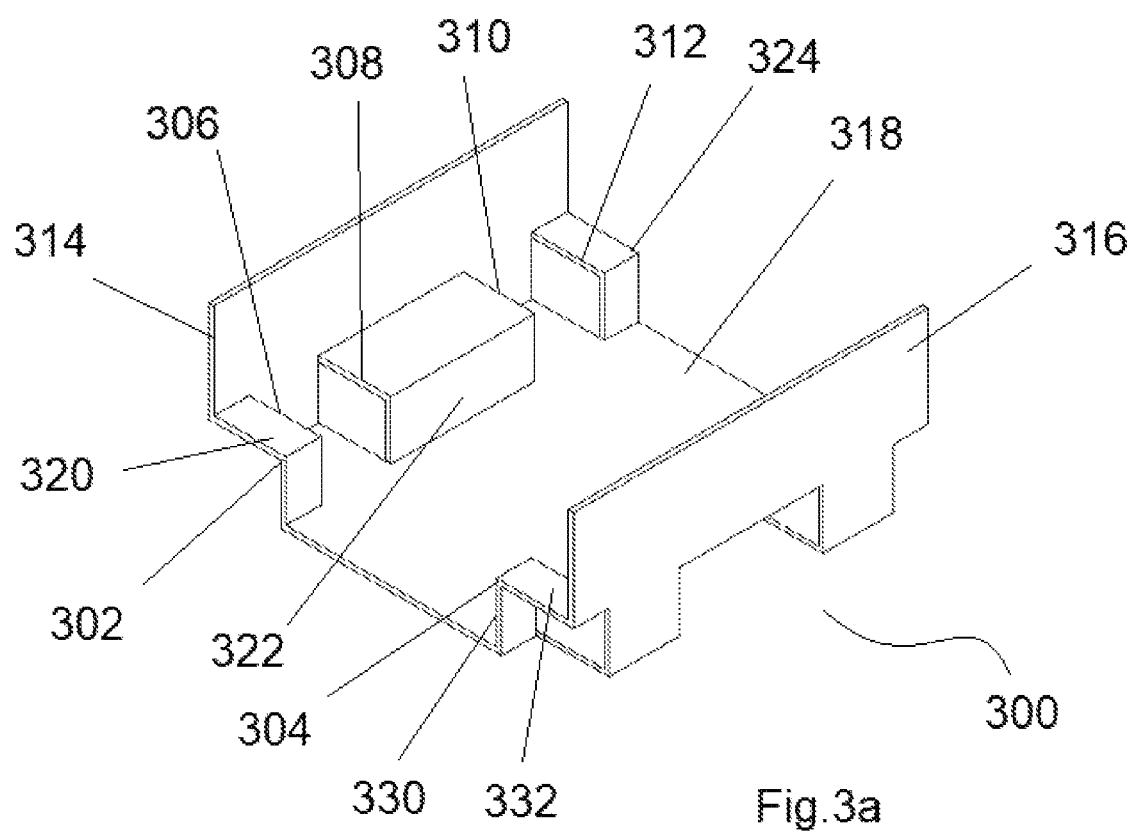
FIG. 3a illustrates a base retaining element for locating in a container to form a stack thereon.

As illustrated in FIG. 3a, base support/retaining element 300 is located in the base of a container such as that illustrated in FIG. 2. The base retaining element 300 is formed from a substantially rectangular sheet of combustible material, e.g. cardboard, by cutting and folding. The sheet is aptly around 97 mm wide and around 177 mm long. A first fold line 302 is created proximal a first end region of the sheet (e.g. around 40 mm from the first end of the sheet) and a second fold line 304 is created proximal a second end region of the sheet (e.g. around 40 mm from the second end of the sheet). Four laterally spaced apart cuts 306,308,310, 312 are made across each fold line. The cuts are around 30 mm long. The innermost cuts 308,310 are spaced apart by around 37 mm. The outermost cuts 306,312 are spaced from the outer edge of the sheet by around 10 mm. The folds allow each end region to be folded upwardly to form two vertical end portions 314,316 oriented substantially perpendicularly to a substantially flat and horizontal base portion 318. The cuts across each fold line allow retaining portions 320,322,324 to be formed by folding inwardly, and two spaces are formed between the retaining portions which are sized to receive and retain a wooden fuel element. The spaces are around 20 mm wide. The spaces on the first fold line are aligned with the spaces on the second fold line such that the wooden fuel elements located therein are substantially parallel with each other and the corresponding side walls of the container. Each retaining portion 320,322,324 provides a vertical oriented surface 330 and a horizontally oriented surface 332. During assembly of the apparatus, the base retaining element 300 is slidably located into the base of the box-like container such that the base portion 304 engages with the flat base of the container and vertical end portions 314,316 engage against the respective inner faces of the sides of the container.

Figure 3B:
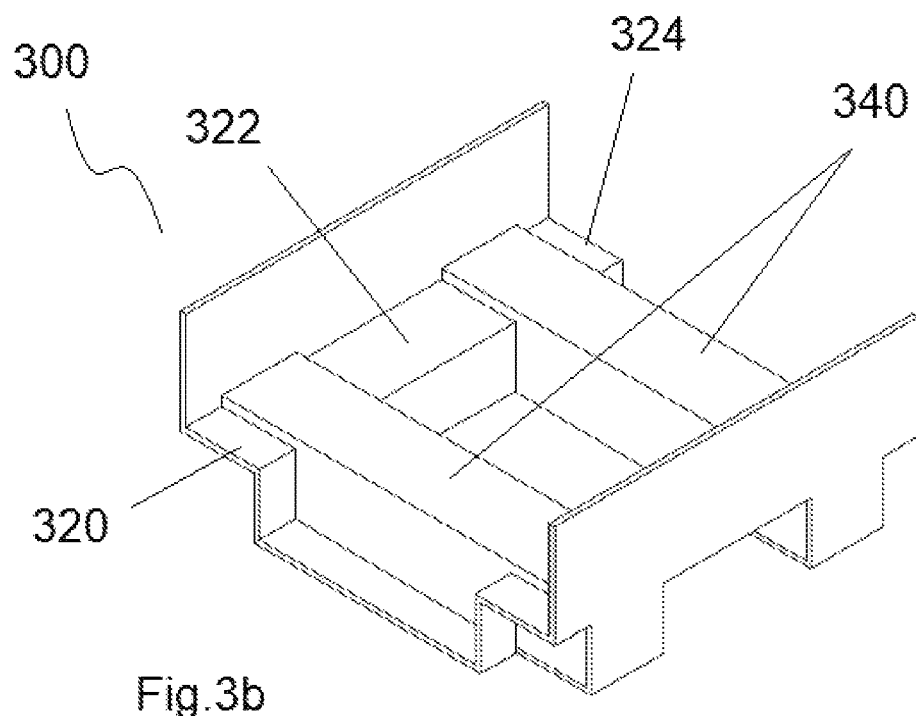
FIG. 3b illustrates a first pair of spaced apart wooden fuel elements located in the base retaining element of FIG. 3a to form a first layer of the stack.

As illustrated in FIG. 3b, a first pair of wooden fuel elements 340 is then located in the spaces provided between the retaining portions 320,322,324 of the base retaining element 300. Each space is sized such that the wooden fuel element is retained therein with no or minimal movement with respect to the base retaining element 300. The first pair of wooden fuel elements 340 form a first layer of a stack of combustible fuel elements and are securely located in the base retaining element 300 to ensure their position and orientation in the container is substantially fixed during assembly, storage, transportation or end use. The first pair of wooden elements 340 are spaced from the side wall of the container comprising the window or in which a window is formed by the user to thereby allow a match or taper to be inserted into the interior of the container to light the flammable fuel element, as described further below.

Figure 3C:
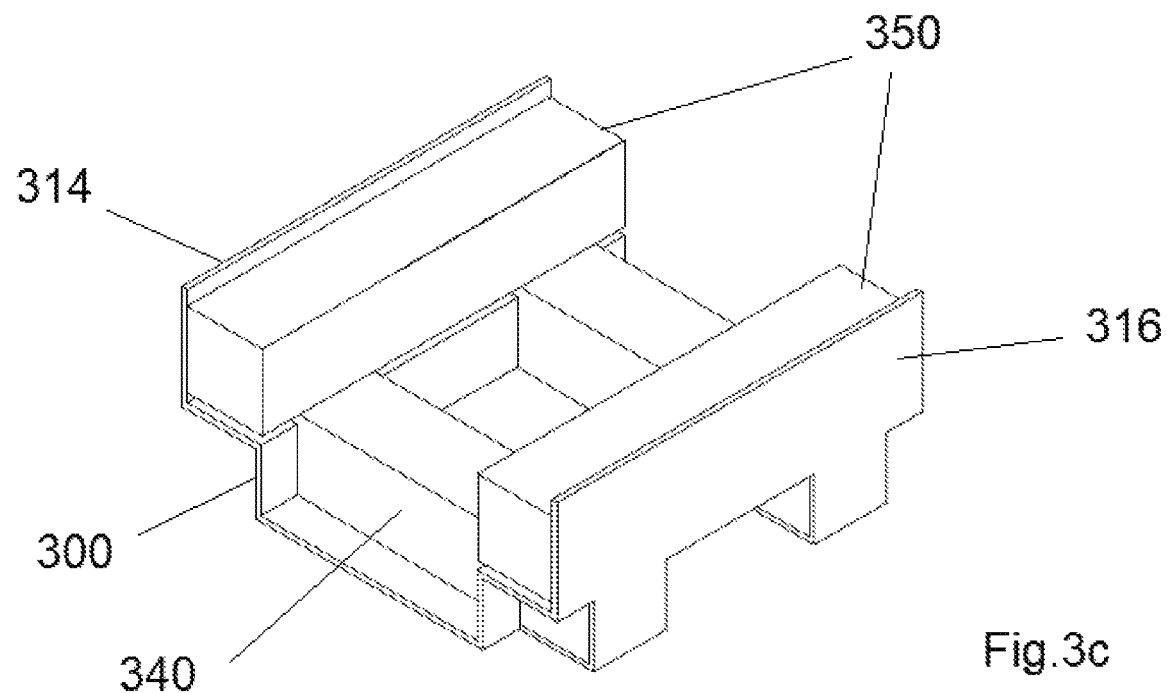
FIG. 3c illustrates a second pair of spaced apart wooden fuel elements located on the first pair of wooden fuel elements to form a second layer of the stack.

As illustrated in FIG. 3c, a second pair of spaced apart wooden fuel elements 350 is then located on the first pair of wooden fuel elements 340 such that the second pair of fuel elements 350 is oriented substantially perpendicularly to the first pair of fuel elements 340. Each second fuel element 350 is located against a respective one of the end portions 314,316 of the base retaining element 300 and optionally on the horizontal surface 332 of the retaining portions 320,322, 324 if the height of the first wooden fuel elements 340 is less than or equal to a height of the retaining portions.

Figure 3D:
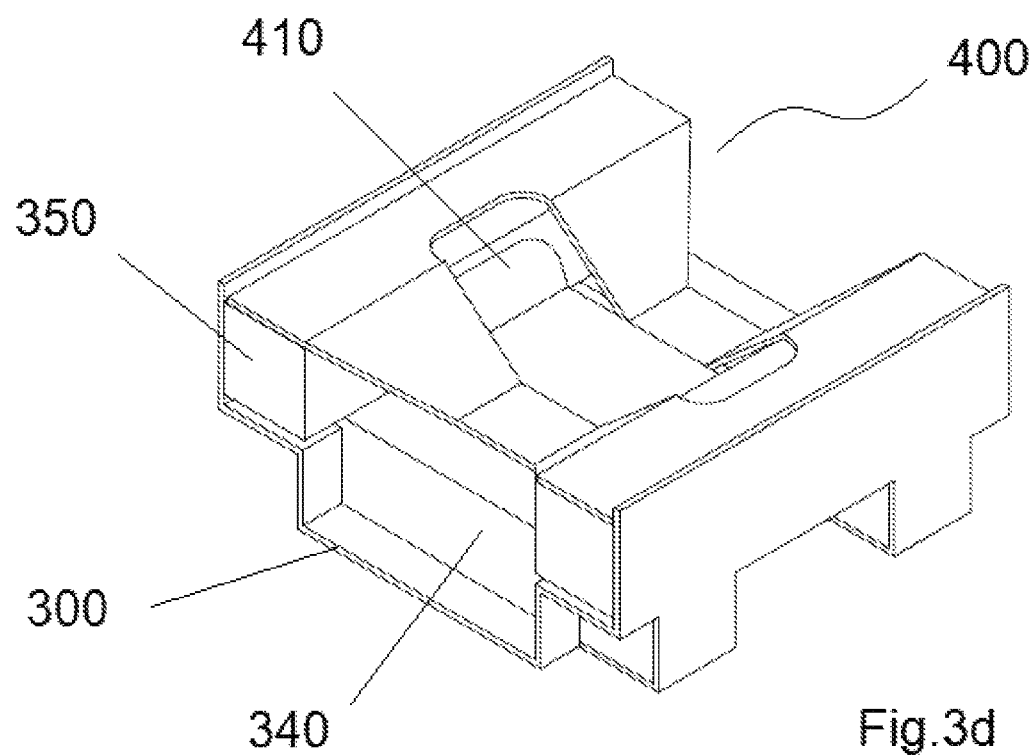
FIG. 3d illustrates an intermediate retaining element for locating on and between the second wooden fuel elements.
Figure 4:
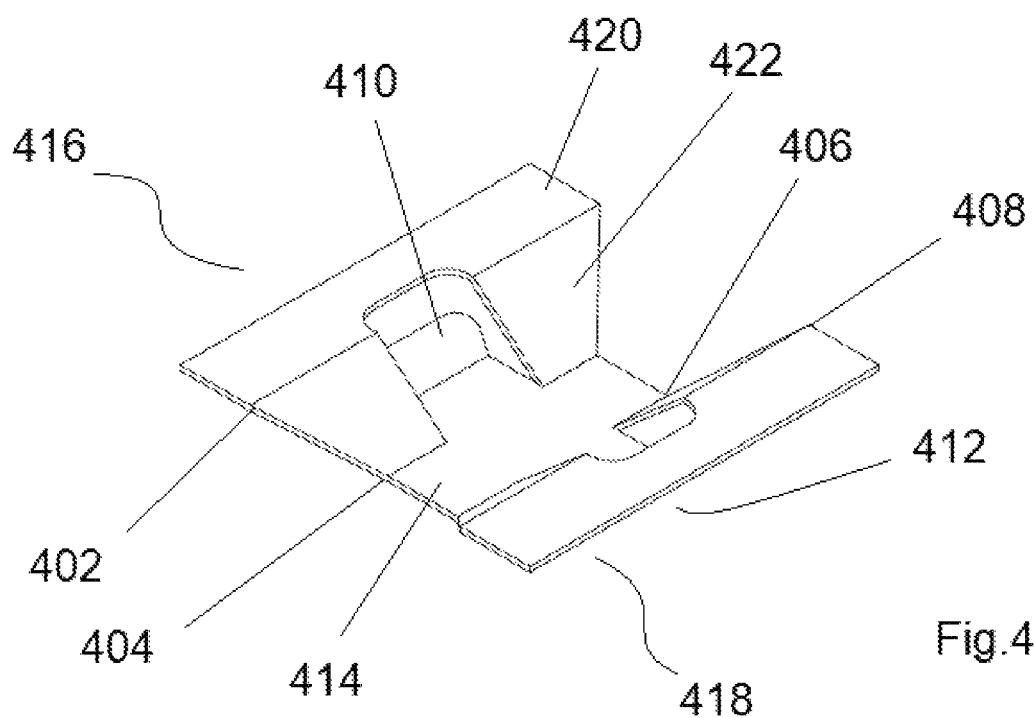
FIG. 4 illustrates the intermediate retaining element.

As illustrated in FIG. 3d, an intermediate retaining element 400 is then located on the second layer of spaced apart wooden fuel elements 350. As shown in FIG. 4, the intermediate retaining member 400 is formed from a sheet of combustible material, e.g. cardboard, by creating four spaced apart fold lines 402,404,406,408 therein. A three-sided cut is made in the sheet extending outwardly from each of the inner fold lines and across each respective outer fold line to allow a pair of retaining portions 410,412 to be created. The retaining portions 410,412 extend outwardly in opposed directions from a substantially flat base portion 414 of the intermediate retaining element 400. Wing portions 416,418 are formed by folding along the inner and outer fold lines to thereby form a channel with apertures in where the retaining members were formed by cutting. The apertures allow air and combustion gases to flow up through the assembled stack from the base of the container to promote efficient burning. Each elongate retaining portion 410,412 includes an end region formed by folding the retaining portion along the outer fold line 402,408. Each end region is angled, e.g. perpendicularly, with respect to the remainder of the retaining portion. The upper portions 420 of each wing portion 416,418 are substantially parallel with the base portion 414 and the inner surfaces 422 of each wing portion 416,418 are substantially angled to define a tapered channel. A length of the base portion 414 is less than a length of the upper surfaces of each wing portion. During assembly, as illustrated in FIG. 3d, the intermediate retaining element 300 is located on the second layer of spaced apart wooden fuel elements 350 such that the base portion 414 sits on the first pair of wooden fuel elements 340 and the upper portion 420 of each wing 416,418 sits on a respective one of the second pair of wooden fuel elements. The outer surface of the end region of each retaining portion 410,412 engages with the inner surface of a respective one of the second pair of wooden fuel elements 450 to urge/retain the same against the side walls of the container and to eliminate/minimise any movement of these fuel elements during assembly, storage, transportation or end use.

Figure 3E:
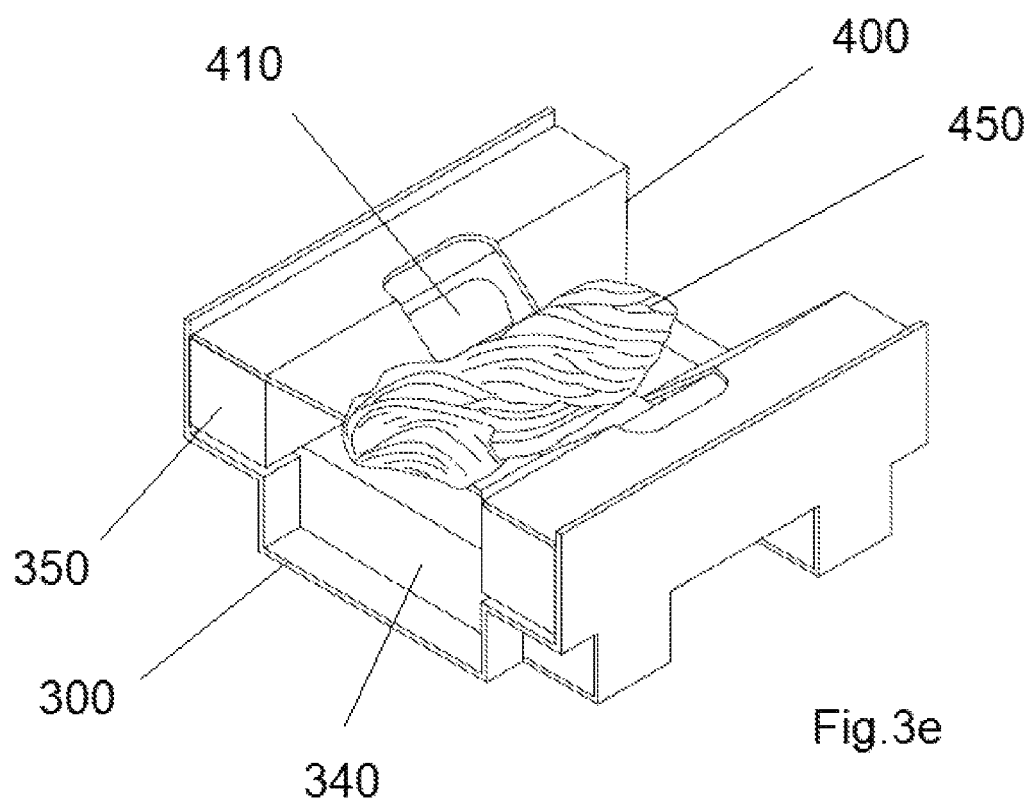
FIG. 3e illustrates a flammable ignition element located on the intermediate retaining element and between the second pair of wooden fuel elements.

As illustrated in FIG. 3e, an elongate flammable ignition element 450, such as a Hexamine-based firelighter or a roll of wax-bound softwood strands or the like, is located in the channel defined by the intermediate retaining element 300. The ends of the ignition element 450 extend beyond the base of the channel and the intermediate retaining element 400 locates the ignition element above the window provided or formed in the base of the container. This arrangement aptly allows a flame inserted through the window of the container to efficiently light the ignition element. Locating the ignition element above the first layer of wooden fuel elements 340 also forces air to be drawn into the container from the window/s below and creates an efficient 'top-down' method of combustion, particularly when the thinner intermediate retaining element 400 is burning and its integrity compromised such that the ignition element, if still burning, drops onto the first layer of fuel elements 340 below.

Figure 3F:
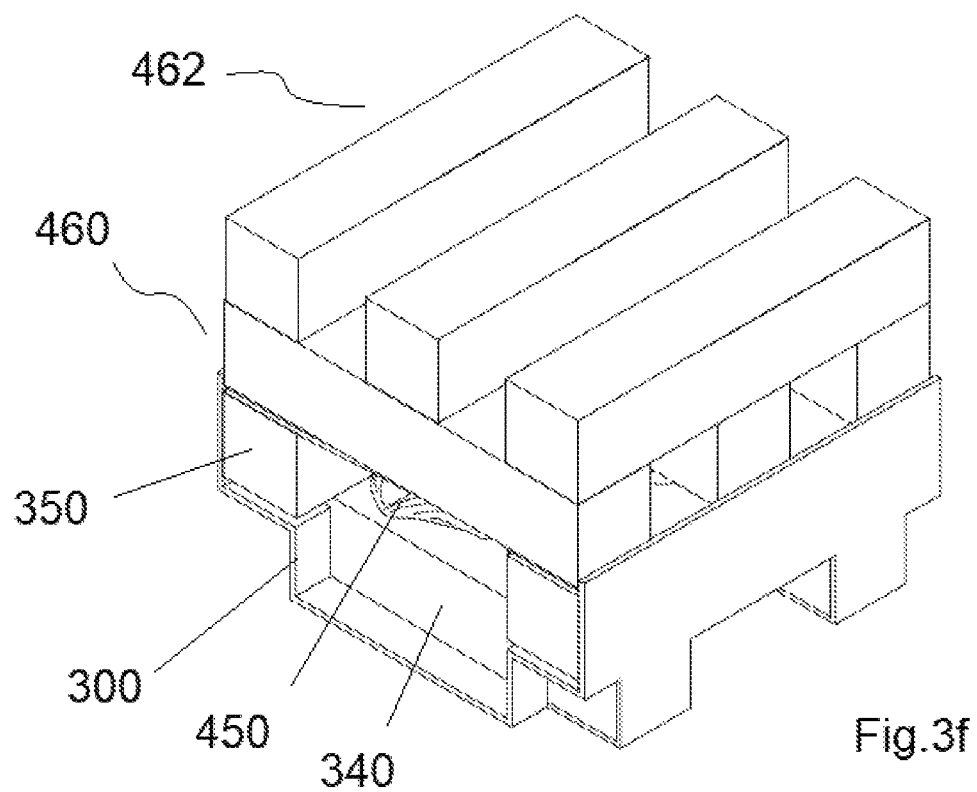
FIG. 3f illustrates third and fourth sets of spaced apart wooden fuel elements to form third and fourth layers of the stack.

As illustrated in FIG. 3f, third and fourth layers 460,462 of spaced apart wooden fuel elements are located on the fuel elements of the second layer such that the fuel elements in adjacent layers are oriented perpendicularly to each other to form a Jenga™-style stack.

Figure 3G:
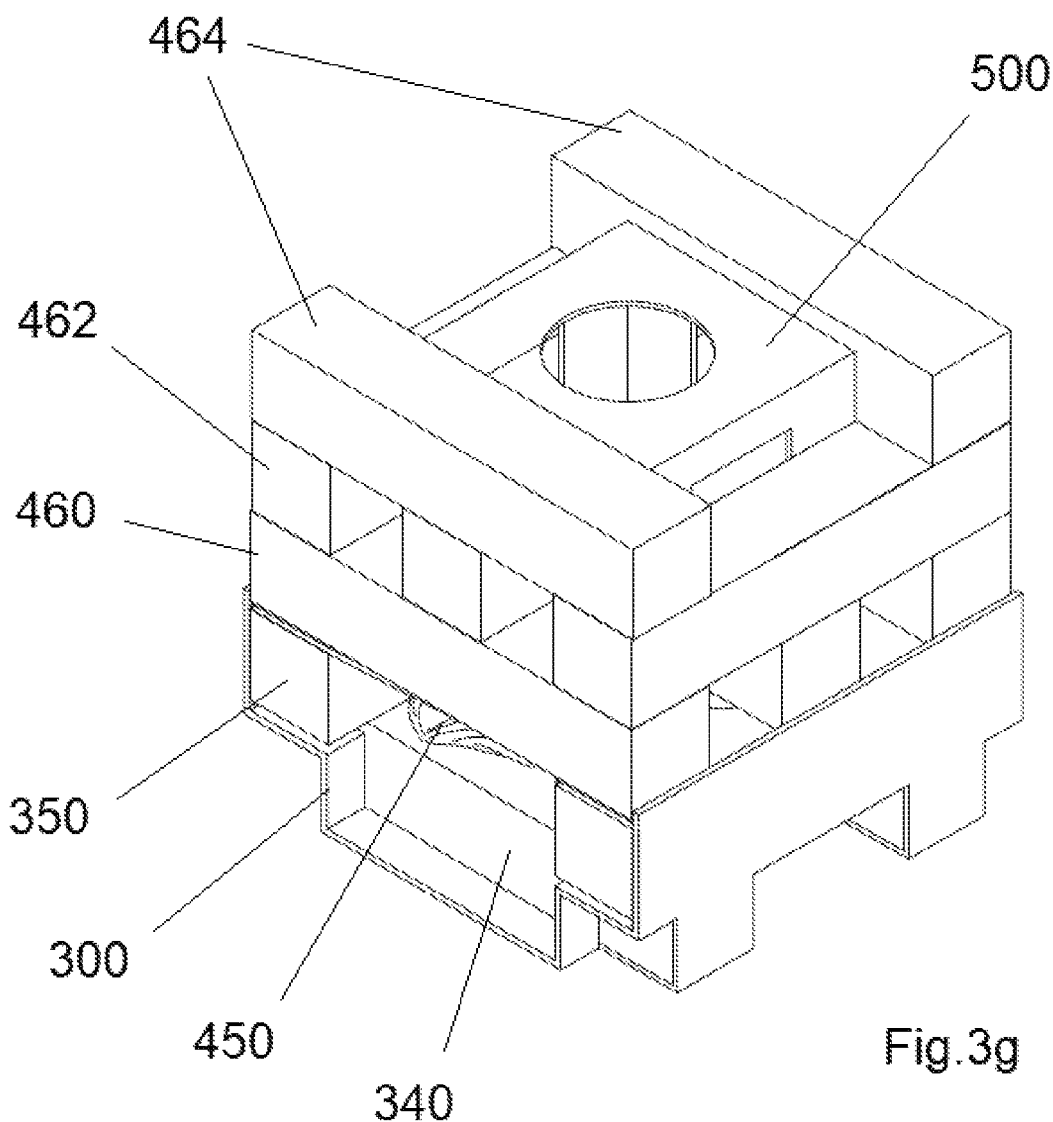
FIG. 3g illustrates a further pair of spaced wooden fuel elements located on the fourth layer to form a fifth layer of the stack, and an upper retaining element located through an upper portion of the stack.
Figure 5:
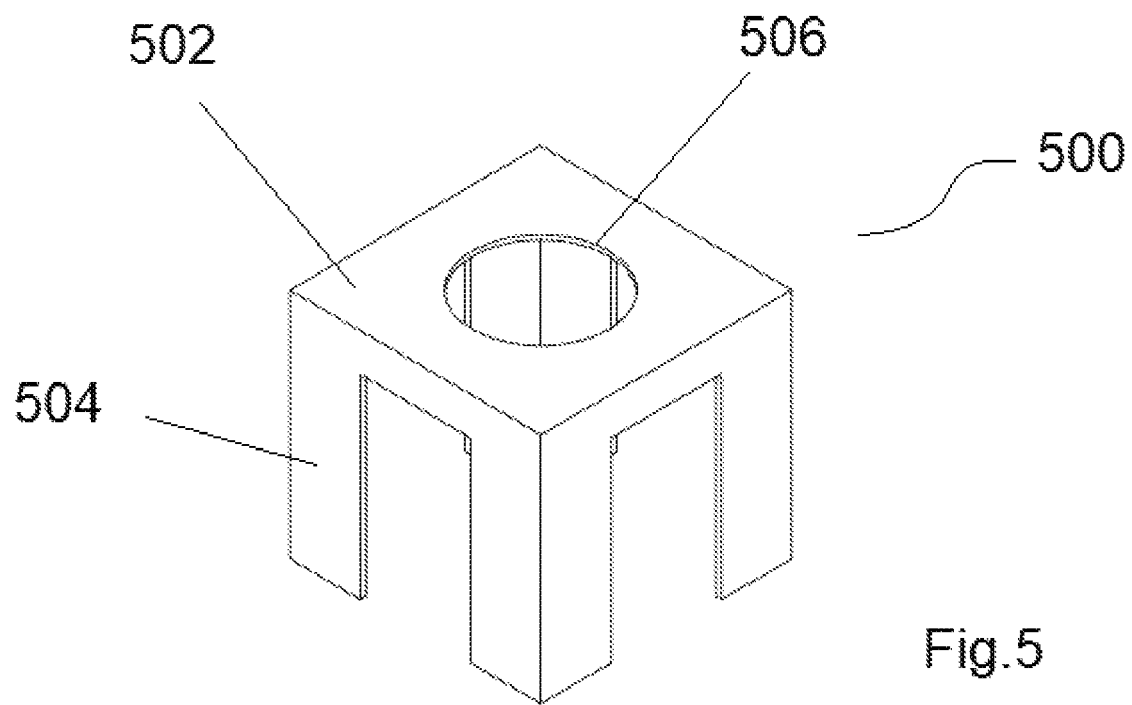
FIG. 5 illustrates the upper retaining element.

As illustrated in FIG. 3g, a further pair of spaced apart wooden fuel elements 464 is located on the fourth layer to form a fifth layer of the stack. The fifth layer is oriented perpendicularly to the fourth layer and each of the pair of further fuel elements 464 is located against the respective wall of the container. An upper retaining element 500 is then located centrally into the upper portion of the stack to retain each fuel element in each of the third, fourth and fifth layers in its desired position and orientation to thereby eliminate/minimise any movement of these fuel elements during assembly, storage, transportation or end use. As illustrated in FIG. 5, the upper retaining element 500 includes a substantially square upper portion 502 and a plurality of elongate legs portions 504 extending downwardly from each corner of the upper portion 502. Each leg portion 504 defines a corner of the retaining element such that it provides two retaining surfaces orientated substantially perpendicularly to each other for engaging with respective surfaces of the fuel elements. The upper portion 502 includes a central aperture 506 which acts as a chimney allows air to flow upwardly through the stack and to guide combustion gases, e.g. smoke, from the burning stack towards an opening in the top of the container. The upper retaining element 500 is formed from a sheet of combustible material, e.g. cardboard, and each side portion thereof is folded downwardly to be perpendicular to the upper portion to thereby form each of the corner leg portions. Optionally, the two sides of each leg portion may be connected together, e.g. by tabs, or with tape or adhesive, such that they do not move apart during assembly of the apparatus. Aptly, the square upper portion 502 is around 56×56 mm and each side portion is around 50 mm long. The sides of each leg portion are around 17 mm wide and the space between adjacent leg portions is around 22 mm. The aperture 506 in the upper portion 502 is around 32 mm in diameter. The space or gap between the leg portions does not extend to the upper portion to thereby locate the flat upper surface of the upper retaining member 500 on or proximal the plane defined by the upper layer of fuel elements 464. This ensures the movement of the upper retaining member 500 in an axial direction of the stack is limited, particularly during storage and transit if, for example, the container is inverted. In this situation, axial movement of the upper retaining member with respect to the stack would be limited by the lid of the container to ensure the fuel elements in the third, fourth and fifth layers remain retained in their desired position and orientation.

A suitable container to contain the stack illustrated in FIGS. 3a to 5 is identical or similar to the container illustrated in FIG. 2. Aptly, the container is substantially box-like having six sides of equal dimensions and a closable lid. The inner dimensions of the container are substantially the same as the outer limits of the assembled stack to thereby ensure, in combination with the retaining elements, the stack does not collapse/move around in the container during assembly, storage, transit, and use. An opening is aptly pre-provided or creatable by a user in the lower portion of the container wall such that the opening is directly under an end region of the flammable ignition element 450. The opening may or may not extend into the base of the container. The container may be configured to provide an opening for igniting either or both end regions of the flammable ignition element, i.e. an opening may be pre-provided or creatable by a user in either or both opposed sides of the container. Providing an opening in the lower portion of both opposed sides of the container allows the ignition element to be lit at one or both ends and also allows additional air to be drawn into the bottom of the stack from both opposed sides.

Certain embodiments of the present invention therefore provide apparatus for quickly and safely starting a fire in an efficient and consistent manner. The apparatus is preassembled which eliminates the need for a user to build a suitable fire or have any knowledge of building a suitable fire. The apparatus is contained which ensures the fuel elements remain in a stack for as long as possible to maximise ignition and combustion efficiency thereof. The apparatus is assembled in a manner which promotes efficient ignition and combustion of the stack of fuel elements thereof. The apparatus ensures a clean start with minimum smoke and soot to thereby be environmentally friendly. The apparatus eliminates the need for large amounts of newspaper to be used as is the case with conventional fire lighting methods which is undesirably a significant source of non-combustible ash. The apparatus is contained and the elements thereof are retained in a desired position and orientation to eliminate/minimise any movement of these fuel elements during assembly, storage, transportation or end use. The size and shape of the assembled apparatus also allows for efficient transit and storage.

The invention claimed is:

1. Apparatus for starting a fire, the apparatus comprising:
a stack of at least three layers of elongate combustible fuel elements located in a combustible container configured to provide at least one aperture proximal a base region thereof, the fuel elements of each of the at least three layers being spaced apart and oriented substantially perpendicularly relative to the fuel elements of an adjacent of the at least three layers; and
a flammable ignition element supported on an intermediate retaining element configured to position the ignition element above the aperture and the fuel elements of a first of the at least three layers of elongate combustible fuel elements,
wherein:
the fuel elements of the first layer are located in a base retaining element disposed on the base region of the combustible container to retain the fuel elements of the first layer in a first predetermined position and orientation within the combustible container; and
the intermediate retaining element is configured to support the ignition element between the fuel elements of a second layer of the stack and below a third layer of the stack.

2. A method of assembling an apparatus for starting a fire, the method comprising:
locating a base retaining element on a base region of a combustible container configured to provide at least one aperture proximal the base region;
locating a first layer of spaced apart and elongate combustible fuel elements in the base retaining element to retain the same in a first predetermined position and orientation within the container;
locating a second layer of spaced apart and elongate combustible fuel elements on the first layer;
locating an intermediate retaining element on the second layer of fuel elements;
supporting a flammable ignition element on the intermediate retaining element to locate the ignition element above the at least one aperture and the first layer of fuel elements and between the fuel elements of the second layer; and
locating a third layer of spaced apart and elongate combustible fuel elements on the second layer to provide a stack of at least three layers of spaced apart combustible fuel elements in the combustible container,
wherein the fuel elements of each of the at least three layers of spaced apart combustible fuel elements are oriented substantially perpendicularly relative to the fuel elements of an adjacent layer.

3. The method according to claim 2, further comprising locating the fuel elements of the first layer on each side of the at least one aperture or an openable portion of the container configured to selectively provide the at least one aperture.

4. The method according to claim 3, further comprising engaging each of the fuel elements of the second layer with a respective one of a pair of elongate retaining portions of the intermediate retaining element to retain the fuel elements in a second predetermined position and orientation within the container.

5. The method according to claim 4, wherein at least one of:
the first predetermined orientation is substantially perpendicular to the second predetermined orientation; or
the first predetermined orientation is substantially parallel with a first side wall of the container providing the at least one aperture.

6. The method according to claim 5, wherein the first predetermined position is spaced away from the first side wall providing the at least one aperture.

7. The method according to claim 2, further comprising locating at least one further retaining element into the stack to prevent the fuel elements of at least the third layer from substantially moving with respect to each other and the container.

8. The method according to claim 2, further comprising closing a lid of the container.

9. The apparatus according to claim 1, wherein the container comprises an openable portion configured to selectively provide the at least one aperture.

10. The apparatus according to claim 1, wherein the intermediate retaining element defines a channel for supporting the ignition element and positioning the intermediate retaining element between the fuel elements of the second layer.

11. The apparatus according to claim 10, wherein the intermediate retaining element comprises a base portion and a pair of elongate retaining portions extending outwardly in opposed directions therefrom to engage and retain a respective one of the fuel elements of the second layer in a second predetermined position and orientation within the container.

12. The apparatus according to claim 11, wherein the first predetermined orientation is substantially perpendicular to the second predetermined orientation.

13. The apparatus according to claim 12, wherein the first predetermined orientation is substantially parallel with a first side wall of the container providing the at least one aperture.

14. The apparatus according to claim 12, wherein the first predetermined position is spaced away from the first side wall providing the at least one aperture.

15. The apparatus according to claim 1, further comprising at least one additional retaining element to prevent the fuel elements of at least the third layer from substantially moving with respect to each other and the container.

16. The apparatus according to claim 15, wherein the at least one additional retaining element comprises a plurality of vertically oriented retaining portions located between the spaced apart fuel elements of at least the third layer.

17. The apparatus according to claim 15, wherein the at least one additional retaining element comprises an upper portion from which each retaining portion extends and having at least one aperture therein.

18. The apparatus according to claim 15, wherein the at least one additional retaining element is combustible.

19. The apparatus according to claim 1, wherein the container comprises at least one further aperture pre-formed or formable in a further side wall thereof.

20. The apparatus according to claim 1, wherein the container comprises a lid having at least one hole pre-formed or formable therein.

* * * * *